(12) United States Patent
Pan et al.

(10) Patent No.: US 12,536,918 B2
(45) Date of Patent: Jan. 27, 2026

(54) AIRSPACE TRAFFIC PREDICTION METHOD BASED ON ENSEMBLE LEARNING ALGORITHM

(71) Applicant: Civil Aviation Flight University of China, Guanghan (CN)

(72) Inventors: Weijun Pan, Guanghan (CN); Sheng Chen, Guanghan (CN); Jianwei Gao, Guanghan (CN); Qinghai Zuo, Guanghan (CN); Xuan Wang, Guanghan (CN); Tian Luan, Guanghan (CN); Rundong Wang, Guanghan (CN)

(73) Assignee: Civil Action Flight University of China, Guanghan (CN)

( * ) Notice: Subject to any disclaimer, the term of this patent is extended or adjusted under 35 U.S.C. 154(b) by 0 days.

(21) Appl. No.: 19/032,551

(22) Filed: Jan. 21, 2025

(65) Prior Publication Data

US 2025/0322759 A1    Oct. 16, 2025

(30) Foreign Application Priority Data

Apr. 12, 2024    (CN) .......................... 202410437635.1

(51) Int. Cl.
| | | |
|---|---|---|
| *G08G 5/72* | (2025.01) | |
| *G06N 3/042* | (2023.01) | |
| *G06N 3/0442* | (2023.01) | |
| *G06Q 10/047* | (2023.01) | |

(52) U.S. Cl.
CPC ............. *G08G 5/727* (2025.01); *G06N 3/042* (2023.01); *G06N 3/0442* (2023.01); *G06Q 10/047* (2013.01)

(58) Field of Classification Search
CPC ...... G08G 5/727; G06N 3/0442; G06N 3/042; G06Q 10/04; G06Q 10/047
See application file for complete search history.

(56) References Cited

FOREIGN PATENT DOCUMENTS

| CN | 116884273 A | * 10/2023 |
|---|---|---|
| CN | 117058927 A | * 11/2023 |
| CN | 117292584 A | * 12/2023 |

(Continued)

OTHER PUBLICATIONS

CN 117690318 A, "Traffic Flow Prediction Method Based on Air Traffic Space-time Dynamic Diagram", Cai et al., Filed Feb. 4, 2024, English Translation (Year: 2024).*

(Continued)

*Primary Examiner* — Jason Holloway
*Assistant Examiner* — Benjamin J Brosh
(74) *Attorney, Agent, or Firm* — Zhigang Ma (57) ABSTRACT

An airspace flow prediction method based on an ensemble learning algorithm is provided, which includes the steps: collecting historical airspace flow data and related spatial structure data, and preprocessing; constructing a GNN model, and calculating an influence degree of each node and an influence degree between the nodes in an airspace network by using the GNN model, the node being any airport or any waypoint; performing, by the GNN model, feature conversion and attention fusion on the influence degree of the node, the influence degree between the nodes and time series data to acquire a fused feature vector; and inputting the fused feature vector into an LSTM model to acquire a predicted airspace flow of the node.

6 Claims, 2 Drawing Sheets collecting historical airspace flow data and spatial structure data related to the historical airspace flow data, and preprocessing the historical airspace flow data and the spatial structure data

↓ constructing a GNN model, and calculating an influence degree of each node of nodes in an airspace network and an influence degree between the nodes by using the GNN model, wherein the node being any airport or any waypoint

↓ performing, by the GNN model, feature conversion and attention fusion on the influence degree of the node, the influence degree between the nodes and time series data to acquire a fused feature vector

↓ inputting the fused feature vector into an LSTM model to acquire a predicted airspace flow of the node

(56) References Cited

FOREIGN PATENT DOCUMENTS

| CN | 117612413 A | * | 2/2024 |
| CN | 117690318 A | * | 3/2024 |
| CN | 118072560 A | * | 5/2024 |

OTHER PUBLICATIONS

CN 118072560 A, "Sector Flow Prediction Method Based on AGC-LSTM", Chen et al., Filed Feb. 22, 2024, English Translation (Year: 2024).*

CN 116884273 A, "Aircraft Four-dimensional Track Prediction Method Based on Multi-machine Interactive Network Model", Chen et al., Filed Jul. 25, 2023 and Published Oct. 13, 2023, English Translation (Year: 2023).*

CN 117058927 A, "Method for Predicting Traffic Network Flow Based on Space-time Feature Fusion", Cheng et al., Filed Jul. 7, 2023 and Published Nov. 14, 2023, English Translation (Year: 2023).*

CN 117292584 A, "Multi-airport Terminal Area Flow Prediction Method and System Based on GCN-LSTM Model", Chen et al., Filed Nov. 24, 2023 and Published Dec. 26, 2023, English Translation (Year: 2023).*

CN 117612413 A, "Method For Identifying Key Node of Unmanned Aircraft Fusion Operation Airspace Based on GCN", Chen et al., Filed Nov. 23, 2023 and Published Feb. 27, 2024, English Translation (Year: 2024).*

China Civil Aviation Flight University (Applicant), Replacement claims (allowed) of CN202410437635.1, May 8, 2024.

CNIPA, Notification to grant patent right for invention in CN202410437635.1, May 20, 2024.

* cited by examiner collecting historical airspace flow data and spatial structure data related to the historical airspace flow data, and preprocessing the historical airspace flow data and the spatial structure data

↓ constructing a GNN model, and calculating an influence degree of each node of nodes in an airspace network and an influence degree between the nodes by using the GNN model, wherein the node being any airport or any waypoint

↓ performing, by the GNN model, feature conversion and attention fusion on the influence degree of the node, the influence degree between the nodes and time series data to acquire a fused feature vector

↓ inputting the fused feature vector into an LSTM model to acquire a predicted airspace flow of the node

AIRSPACE TRAFFIC PREDICTION METHOD BASED ON ENSEMBLE LEARNING ALGORITHM

CROSS-REFERENCE TO RELATED APPLICATION

This application claims priority to Chinese Patent Application No. 202410437635.1, filed on Apr. 12, 2024, which is herein incorporated by reference in its entirety.

TECHNICAL FIELD

The present disclosure relates to the technical field of airspace flow prediction, in particular to an airspace flow prediction method based on an ensemble learning algorithm.

BACKGROUND

At present, the research on airspace flow prediction methods mostly focuses on using relevant algorithms of machine learning, and the mainly used prediction methods and models are an Attention Temporal Graph Convolutional Network (AT-GCN), a Grey Long Short-Term Memory Network (Grey LSTM), Wavelet Transform, a Back Propagation Neural Network (BPNN), a least square method, a fractal interpolation method and the like. The above methods have certain advantages in the aspect of airspace flow prediction, but they also have limitations.

For the AT-GCN, the complexity of the model leads to a higher demand on computing resources, requires a lot of data for effective training, and requires higher data quality and structure. If airspace structure data and air traffic flow data are insufficient or inaccurate, the performance of the model is possibly affected. For the Grey LSTM, the performance of the model depends largely on the quality and method of data preprocessing. In addition, the application scope and effectiveness of a grey theory are possibly different due to the characteristics of data, which limits the universality of the model. For the wavelet transform, although the wavelet transform is very effective in the aspects of feature extraction and signal analysis, the performance of the model largely depends on an appropriate wavelet basis and parameter selection. For the BPNN, it is easily influenced by over-fitting, especially in the case of insufficient data or too many features. In addition, the model is very sensitive to the selection of hyperparameters, and the best network structure and parameters need to be determined through many experiments. For the least square method, it is mainly suitable for linear models, and possibly cannot provide accurate prediction for complex nonlinear relationships. At the same time, the least square method is very sensitive to abnormal values, which possibly leads to a decrease in the prediction performance of the model. Fractal interpolation method: the calculation process is relatively complex, and has higher demand on self-similarity of data, and when the data does not conform to fractal characteristics, the effectiveness of the model is possibly limited.

Therefore, the ensemble learning algorithm has more advantages in the problem of airspace flow prediction. The traditional ensemble learning algorithm is mainly divided into the following categories: Bagging (Bootstrap Aggregating), boosting, stacking generalization, and voting.

The bagging is an integrated technology to reduce variance in combination with multiple models, and is mainly used to reduce over-fitting. In Bagging, an original training data set is randomly sampled to generate multiple different training subsets. Random sampling is usually sampling with playback, and each subset is used to train a model. The final prediction is acquired by averaging or majority voting of the prediction results of all models.

The boosting is an integrated technology that can reduce deviation and variance. Different from bagging, a core idea of boosting is to connect a series of weak learners in sequence, and each learner tries to correct mistakes of the previous learner. Each model is weighted according to performance of the previous model, so as to improve the performance of the whole model.

The stacking generalization is a method to improve the prediction accuracy in combination with several different models. In stacking, different models are trained to predict the same output, and then a trained meta-model is used to synthesize these predictions into a final prediction result. The key to stacking lies in diversity of these basic models and the choice of the meta-model.

The voting is a simple integrated method, which votes based on the prediction results of multiple models. Voting may be simple majority voting (hard voting) or weighted voting based on probability (soft voting). The hard voting calculates the number of votes in each category and selects the category with the most votes, while the soft voting considers the prediction probability of the category and usually provides better performance.

SUMMARY

An objective of the present disclosure is to improve the existing ensemble learning algorithm and provide an airspace flow prediction method based on an ensemble learning algorithm.

In order to achieve the above objective of the present disclosure, embodiments of the present disclosure provide the following technical solution:

An airspace flow prediction method based on an ensemble learning algorithm includes the following steps:
  step 1, collecting historical airspace flow data and related spatial structure data and preprocessing;
  step 2, constructing a GNN model, and calculating an influence degree of each node and an influence degree between the nodes in an airspace network by using the GNN model, the node being any airport or any waypoint;
  step 3, performing, by the GNN model, feature conversion and attention fusion on the influence degree of the node, the influence degree between the nodes and time series data to acquire a fused feature vector; and
  step 4, inputting the fused feature vector into an LSTM model to acquire the predicted airspace flow of the node.

Compared with the prior art, the present disclosure has the beneficial effects as follows.

(1) The diversity of the models improves the accuracy of prediction results: the ensemble learning of the present disclosure predicts the airspace flow of an airport in combination with the GNN model and the LSTM model, and these two models can learn the data from different angles and provide complementary information, thus increasing the overall prediction accuracy. The GNN model is responsible for predicting the influence of the airport and a flying aircraft on the airspace flow, and the LSTM model is responsible for predicting a fluctuation of the airspace flow with time.

(2) The ability of processing complex and nonlinear data is improved: the LSTM model optimizes the capture of long-term dependencies in the time series data and processes dynamic changes of the data. The GNN model can capture a complex spatial relationship between the nodes through calculation on graph structure data. Dynamic weight fusion further enhances adaptability of the model, automatically adjusts a weight ratio of each influencing factor and a feature fusion ratio of two types of data, and optimizes the understanding and prediction for complex data structures and nonlinear relationships. This method makes full use of the advantages of time series analysis and graph structure analysis, and improves the performance of the model in processing multi-dimensional and high-complexity data.

(3) The robustness of the model is improved: the prediction method used in the present disclosure can automatically compensate possible shortcomings of single models and improve the processing ability of the whole model for abnormal data and the tolerance for noise, thus enhancing the robustness of the model.

(4) The computational efficiency is improved: the LSTM model and the GNN model are more efficient in processing the data types (the time series data and graph structure data) that they are good at, which reduces unnecessary computational burdens. By dynamically adjusting the feature fusion ratio of the two types of data, the dependence on relatively complex models in some cases can be reduced and the allocation of computing resources is optimized.

BRIEF DESCRIPTION OF DRAWINGS

In order to explain the technical solution of the embodiments of the present disclosure more clearly, the following will briefly introduce the accompanying drawings required to be used in the embodiments. It should be understood that the following accompanying drawings only show some embodiments of the present disclosure, and thus should not be regarded as limiting the scope. For those ordinary skilled in the art, other related accompanying drawings can be acquired according to these accompanying drawings without creative work.

DETAILED DESCRIPTION OF EMBODIMENTS

In the following, the technical solution in the embodiments of the present disclosure will be described clearly and completely in combination with the accompanying drawings in the embodiments of the present disclosure. Apparently, the described embodiments are only part but not all of the embodiments of the present disclosure. The components of the embodiments of the present disclosure generally described and illustrated in the drawings herein may be arranged and designed in various different configurations. Therefore, the following detailed descriptions of the embodiments of the present disclosure provided in the accompanying drawings are not intended to limit the claimed scope of the present disclosure, but merely represent selected embodiments of the present disclosure. Based on the embodiments of the present disclosure, all other embodiments acquired by those skilled in the art without creative work belong to the scope of protection of the present disclosure.

It should be noted that similar numbers and letters indicate similar items in the following accompanying drawings. Therefore, once a certain item is defined in one accompanying drawing, there is no need to further define and explain it in subsequent accompanying drawings. Meanwhile, in the descriptions of the present disclosure, the terms "first" and "second" are only used for distinguishing descriptions, and cannot be understood as indicating or implying relative importance, or implying any such actual relationship or order between these entities or operations. In addition, the terms "connected", "connection" and the like may be direct connection between elements or indirect connection through other elements.

The present disclosure improves the traditional ensemble learning algorithm stacking, integrates a GNN model and an LSTM model together, and predicts an airspace flow depending on historical data. The GNN model is used to determine the influence of a position relationship between airports and aircrafts on the airspace flow, and analyze the influence degree of the airspace flow; the LSTM model is used to analyze the data highly related to time and predict the airspace flow of the airport. The improved ensemble learning algorithm improves the overall prediction performance through prediction results of two different prediction models, and can improve the accuracy and stability.

Figure 1:
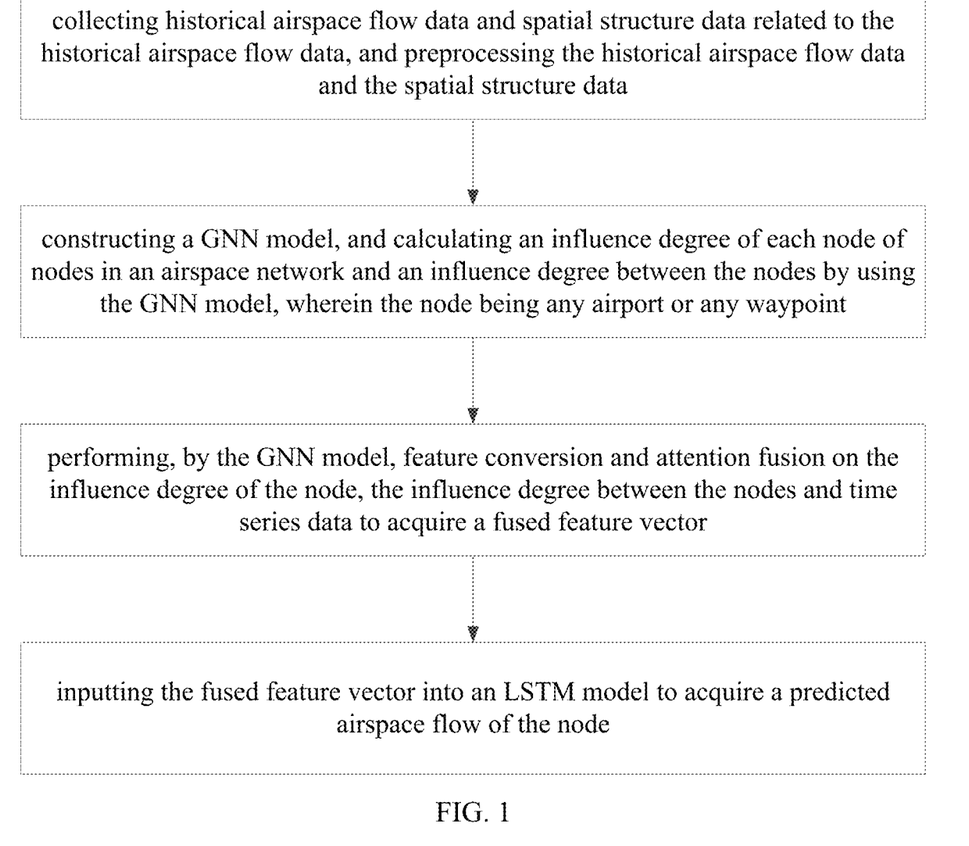
FIG. 1 is a flow chart of a method of the present disclosure.

The present disclosure is realized by the following technical solution, as shown in FIG. 1, an airspace flow prediction method based on an ensemble learning algorithm includes steps 1-4.

In the step 1, historical airspace flow data and related spatial structure data are collected and preprocessed.

The historical airspace flow data, such as ADS-B data and flight data, and related spatial structure data, such as location information of surrounding airports and airports to be predicted (i.e., the airports in an airspace network), aircraft trajectory information and waypoints in the ADS-B data, are collected. Then the collected data are cleaned, missing values and abnormal values are processed, and the data are standardized or normalized to facilitate model learning. Then, the historical airspace flow data are converted into a time series format, so as to be input into the long short-term memory network (LSTM) model when feature fusion is performed later. Then, the spatial structure data are constructed into graph structure data, nodes in the graph structure data represent airport airspace areas or the waypoints between the airports, and edges between the nodes represent aircraft flow mobility or connectivity between the nodes, so as to serve as input of the graph neutral network (GNN) model.

In the step 2, the GNN model is constructed, an influence degree of each node and an influence degree between the nodes in the airspace network are calculated by using the GNN model, and the node is any airport or any waypoint.

The GNN model learns the representation of a graph structure, and outputs the influence of the airports and aircrafts in the airspace network on the airspace flow, instead of specific prediction tasks; and the LSTM model completes specific prediction of the airspace flow.

In an embodiment, the step 2 includes steps 2-1 and 2-2.

In the step 2-1, the influence of each airport on the airspace flow is output: if the node is defined as the airport, the GNN model determines the influence degree of airport i on the airspace flow according to a node degree, a node closeness and a node betweenness centrality of airport i.

Figure 2:
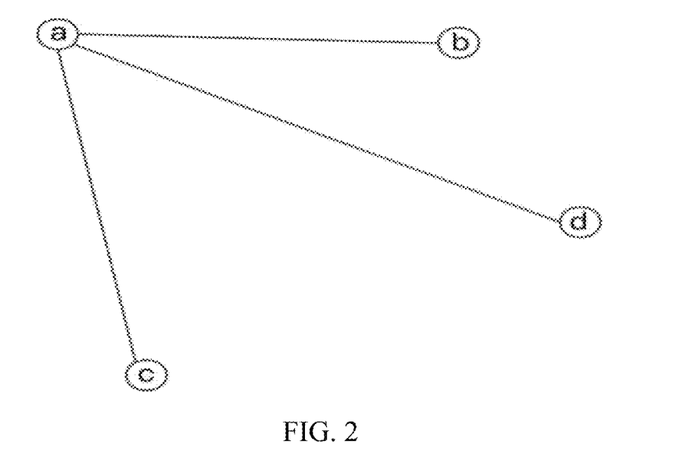
FIG. 2 is a schematic diagram of airports as nodes according to an embodiment of the present disclosure.

The node degree refers to the number of edges directly connected with the node. For an undirected graph, the node degree is the number of edges connected with the node; for a directed graph, node in degree refers to the number of edges pointing to the node, and node out degree refers to the number of edges of the node pointing to other nodes. Then a calculation formula of the node degree in the undirected graph is:

$$D(i) = Ns(i)$$

where $D(i)$ represents the node degree of the airport i; $Ns(i)$ represents the number of edges connected with the airport i. As shown in FIG. 2, if a, b, c and d are all airports, the node degree $D(a)$ of airport a is equal to 3.

Figure 3:
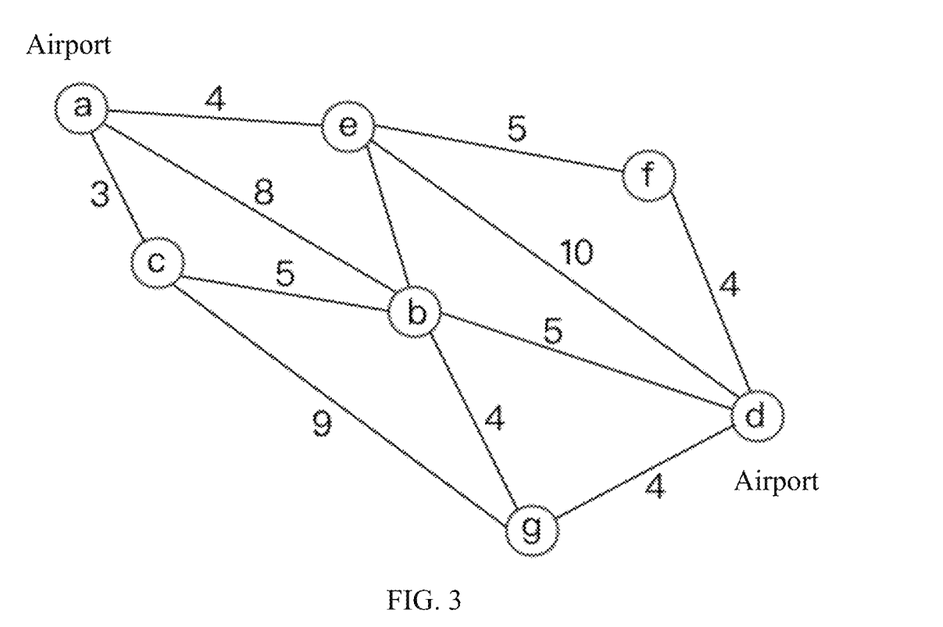
FIG. 3 is a schematic diagram of airports and waypoints as nodes according to an embodiment of the present disclosure.

The node closeness measures a distance between a node and other nodes, and is a reciprocal of a sum of shortest path lengths from the node to other nodes. The node closeness of airport i may be obtained by calculating the reciprocal of the sum of the shortest path lengths from airport i to all other airports:

$$C(i) = \frac{1}{\sum_{j \neq i} d(i,j)}$$

where $C(i)$ represents the node closeness of the airport i; j represents other airport connected with the airport i; $d(i,j)$ represents the shortest path length between the airport i and the airport j. As shown in FIG. 3, a and d are both airports, and b, c, e, f and g may be understood as waypoints between airport a and airport b. FIG. 3 shows the path lengths between every two nodes (the unit is self-defined), then the shortest paths abd, aefd and acbd between airport a and airport d, and the path lengths are all 13. Therefore, the shortest path length $d(a, d)$ between airport a and airport d is equal to 13.

The node betweenness centrality measures the degree that a node acts as a "bridge" or "transit station" in the airspace network, and is a ratio of the number of shortest paths passing through the node between all node pairs. The node betweenness centrality of airport i may be acquired by calculating the sum of all shortest paths passing through airport i:

$$B(i) = \sum_{s \neq i \neq t} \frac{\sigma_{st}(i)}{\sigma_{st}}$$

where $B(i)$ represents the node betweenness centrality of the airport i; s represents an airport s and t represents an airport t; $\sigma_{st}$ represents a number of shortest paths from the airport s to the airport t; and $\sigma_{st}(i)$ represents a number of paths passing through the airport i in the shortest paths from the airport s to the airport t.

Finally, the influence degree of airport i on the airspace flow is:

$$ID(i) = \alpha \cdot \frac{D(i)}{\max D} + \beta \cdot \frac{C(i)}{\max C} + (1 - \alpha - \beta) \cdot \frac{B(i)}{\max B}$$

where $ID(i)$ represents the influence degree of the airport i on the airspace flow, and is also called node influence degree; $\alpha$ and $\beta$ are weight factors; maxD represents a maximum node degree of all airports; maxC represents a maximum node closeness of the all airports; and maxB represents the maximum node betweenness centrality of the all airports.

Through step 2-1, the influence degrees of all airports on the airspace flows per se are constructed in the GNN model. Assuming that there are 10 airports in total, then the influence degrees $ID(i)$ (i=1, 2, ..., 10) of 10 nodes may be calculated respectively.

In the step 2-2, the influence of each aircraft on the airspace flow is output: when analyzing the influence of the aircraft on the airspace flow, the nodes are defined as the airports or the waypoints on flight routes between the airports. For example, the airplane may have multiple flight routes from airport a to airport d, and then it may be defined that there are multiple waypoints on the flight route from airport a to airport d. As shown in FIG. 3, a and d are defined as the airports and b, c, e, f and g are waypoints, then node e is the waypoint between node a and node d, and there is also waypoint f between node e and node d. At the same time, there may be multiple flight routes between waypoint i and waypoint j, and any flight route may also have the waypoints. Therefore, the airports and waypoints can be nodes when analyzing the influence of the aircraft on the airspace flow. The GNN model determines the influence degree of the aircraft on the airspace flow of airport i according to the number of common paths and a shortest path length of the aircraft and a clustering coefficient.

The number of common paths refers to the number of paths shared between two nodes. Assuming that there are multiple paths between node i and node j, the number of common paths may be calculated by traversing all possible paths and counting the number of nodes passed by the paths, and a calculation formula is:

$$CP(i,j) = \sum_{k \neq i,j} \frac{\sigma_{ik} \cdot \sigma_{kj} \cdot \rho_{ij}}{\rho_{ikj}}$$

where $CP(i,j)$ represents the number of common paths between a node i and a node j; $\sigma_{ik}$ represents a number of paths from the node i to a node k; $\sigma_{kj}$ represents a number of paths from node k to node j; $\rho_{ij}$ represents a number of paths from the node i to the node j; and $\rho_{ijk}$ represents the number of paths from node i to node j through the node k. As shown in FIG. 3, if node i is a in FIG. 3, node j is d in FIG. 3 and node k is b in FIG. 3, then $\sigma_{ab}$ is equal to 2, $\sigma_{bd}$ is equal to 2, $\sigma_{ad}$ is equal to 7 and $\sigma_{abd}$ is equal to 1.

The shortest path length referring to the minimum number of edges passed by the shortest path between two nodes, and a calculation formula is:

$$SP(i,j) = \min(ad(i,j))$$

where $SP(i,j)$ represents the minimum number of edges of the shortest path from the node i to the node j; and $ad(i,j)$ represents a number of shortest path edges between the node i and the node j. As shown in FIG. 3, the shortest paths from the node a to the node d are abd, aefd and acbd, and the path lengths are all 13, then $D(a)$ is equal to 3, D(a) represents the number of edges connected with node a, the same as the calculation method in the step 2-1, D(d) is equal to 4, and D(d) represents the number of edges connected to node d. Since the number of path edges of path abd is 2, the number of path edges of aefd is 3, and the number of path edges of acbd is 3, then ad(a,d) is equal to (2,3,3), and SP(i,j) is equal to min (2,3,3)=2.

The clustering coefficient measures a degree of connection between neighbor nodes of node i, and is a ratio of the actual number of connections between the neighbor nodes of the node i to the number of all possible connections. For node i in the undirected graph, a calculation formula of the clustering coefficient is:

$$CC_i = \frac{2N(i)}{D(i) \cdot D(i-1)}$$

where CC(i) represents the clustering coefficient between the neighbor nodes of the node i; N(i) represents a number of edges connected between the neighbor nodes of the node i; D(i) represents the node degree of the node i; and D(i−1) represents a node degree of a neighbor node i−1. As shown in FIG. 3, the neighbor nodes of node a include c, b and e, where only c and b are connected, so N (a) is equal to 1; assuming that node i is a in FIG. 3 and node i−1 is d in FIG. 3, then D(a) is equal to 3, D(d) is equal to 4 and $CC_a$ is equal to $(2×1)/(3×4)$.

The influence degree of the aircraft on the airspace flow of airport i is:

$$IP(i, j) = \gamma \cdot \frac{CP(i, j)}{\max CP} + \delta \cdot \frac{1}{SP(i, j)} + (1 - \gamma - \delta) \cdot \frac{CC(i)}{\max CC}$$

where IP(i,j) represents the influence degree of the aircraft on the airspace flow of the airport i from the node i to the node j, and is also called influence degree between the nodes; γ and δ are weight factors; maxCP represents the maximum number of common paths between all node pairs; maxCC represents the clustering coefficient between the neighbor nodes of all nodes.

Through step 2-2, the influence degrees between all nodes on the airspace flow are constructed in the GNN model, and may be understood as the influence degree of the aircraft on the airspace flow. Assuming that there are 20 nodes in total, then the influence degrees IP(1,j), j≠i of 19 nodes on the first node (i=1) may be calculated respectively; in this way, for 20 nodes, the influence degrees between 19×20 nodes may be calculated.

Step 3, the GNN model performs feature conversion and attention fusion on the influence degree of the node, the influence degree between the nodes and time series data to acquire a fused feature vector.

The GNN model performs the functions of feature conversion and attention fusion mechanism, where the feature conversion is as follows.

The time series data $H_t$ is the historical airspace flow data in a time series format, and feature conversion is respectively performed on the time series data $H_t$ and a spatial feature vector $FV_t$ to fuse in a same feature space:

$$FV_{t'}(i) = FV_t(i) \| ID(i) \| Agg_{j \in NN(i)} IP(i, j)$$

where $FV_t(i)$ represents the spatial feature vector of node i; ID(i) represents the influence degree of node i on the airspace flow; NN(i) represents a neighbor node set of node i; j represents the neighbor node of node i; IP(i,j) represents the influence degree of the aircraft on the airspace flow of node i from node i to node j; $Agg_{j \in NN(i)} IP(i,j)$ represents to aggregation operation on the IP(i,j) of all neighbor nodes j of the node i; and $FV_{t'}(i)$ represents the spatial feature vector of the node i after feature conversion.

Weight feature conversion is performed through a full connection layer (or other types of neural network layers) to ensure that the time series data $H_t$ and a spatial feature vector $FV_t$ are in the same feature space:

$$H_{t'}(i) = W_h \times H_t(i) + b_h$$

$$FV_{t''}(i) = W_{fv} \times FV_{t'}(i) + b_{fv}$$

where $H_t(i)$ represents the time series data of the node i; $H_{t'}(i)$ represents the time series data of the node i after weight feature conversion, and $W_h$ represents a weight matrix of the time series data; $b_h$ represents a bias term of the time series data; $FV_t(i)$ represents the spatial feature vector of the node i after weight feature conversion; $FV_{t''}(i)$ represents the spatial feature vector of the node i after weight feature conversion; $W_{fv}$ represents a weight matrix of the spatial feature vector; and $b_{fv}$ represents a bias term of the spatial feature vector.

The attention fusion mechanism is:

an attention weight is calculated by a softmax function to ensure that the sum of all weights is 1:

$$\alpha_t = \frac{\exp(e_t^{(h)})}{\exp(e_t^{(h)}) + \exp(e_t^{(fv)})}$$

$$\beta_t = \frac{\exp(e_t^{(fv)})}{\exp(e_t^{(h)}) + \exp(e_t^{(fv)})}$$

where $\alpha_t$ represents the attention weight of $H_{t'}(i)$; $\beta_t$ represents the attention weight of $FV_{t''}(i)$; $e_t^{(h)}$ represents a score of $H_{t'}(i)$ and $e_t^{(fv)}$ represents a score of $FV_{t''}(i)$, which are calculated through the full connection layer:

$$e_t^{(h)} = \sigma(W_{att} \times H_{t'}(i) + b_{att})$$

$$e_t^{(fv)} = \sigma(W_{att} \times FV_{t''}(i) + b_{att})$$

where σ represents a sigmoid function, $W_{att}$ represents a weight matrix, and $b_{att}$ represents a bias term.

The importance of $H_{t'}(i)$ and $FV_{t''}(t)$ in each time step t is dynamically determined by the attention fusion mechanism, and the effective fusion of feature vectors is realized:

$$X_t(i) = \alpha_t \times H_{t'}(i) + \beta_t \times FV_{t''}(i)$$

where $X_t(i)$ represents the fused feature vector.

It should be noted that for different nodes i, the weights involved in this step, such as $W_h$, $W_{fv}$, $\alpha_t$ and $\beta_t$, will change dynamically to realize dynamic weight fusion.

Step 4, the fused feature vector is input into the LSTM model to acquire the predicted airspace flow of the node.

$X_t$ (i) is taken as input of the LSTM model, and a time series is predicted by using the LSTM model;

$$Y_{t+1}(i) = LSTM(X_t(i))$$

where $Y_{t+1}$ (i) represents the predicted airspace flow of the node i. Assuming that there are 20 nodes including the airports and the waypoints, when it is necessary to predict the airspace flow of the ninth node (i–9), the ID(9) and ID(9,j) (j=1, 2, . . . , 20, j≠9) in step 2 are extracted, then step 3 is executed to acquire the predicted airspace flow $Y_{t+1}$(9) of the ninth airport.

Assuming that there are N nodes and M time steps (historical time series data, t=1, 2, . . . , M), and in the N nodes, there are N1 airports and the rest nodes are waypoints. The influence degree of the node output by the GNN model is expressed as ID(i), and the influence degree between the nodes of node i on node j is expressed as IP(i,j), for moment t, the prediction result of the LSTM model is $Y_t$ (i), and the target of a loss function L of the overall model integrated by the GNN model and the LSTM module is to make the prediction result as close as possible to the real airspace flow data $Y_t$, then the loss function L is:

$$L = \frac{1}{N}\sum_{i=1}^{N} \omega_i \cdot MSE(Y_t(i), Y(i)) + $$

$$\lambda_1 \cdot \frac{1}{N1}\sum_{i=1}^{N1} ID(i) + \lambda_2 \cdot \frac{1}{N1(N-1)}\sum_{i=1}^{N1}\sum_{j=1,j\neq i}^{N} IP(i,j)$$

where L represents the loss function; N represents a total number of nodes, N1 represents a total number of airports as the nodes, N≥N1, and i represents a $i^{th}$ node; $\omega_i$ represents a weight of the node i, and is used to adjust a weight of the node i to the loss function; $Y_t$ (i) represents a predicted airspace flow of the node i at all time steps; Y(i) represents a real airspace flow of the node i; MSE($Y_t$(i), Y(i)) represents a mean square error between the predicted airspace flow and the real airspace flow of the node i; $\lambda_1$ represents the weight of ID(i), $\lambda_2$ represents the weight of IP(i,j), and $\lambda_1$ and $\lambda_2$ are used to balance the importance among the prediction result, the influence degree ID(i) of the node and the influence degree IP(i,j) between the nodes.

In an embodiment, the airspace flow prediction method based on the ensemble learning algorithm further includes: applying the predicted airspace flow in dynamic airspace allocation to adjust airspace resources dynamically based on a predicted traffic density, which includes the following steps: traffic density analysis, including: using predicted traffic data from a GNN-LSTM model to identify high-density airspace regions and categorizing these regions by criticality (e.g., low, moderate, high congestion); sector adjustment, including: for high-density regions, expanding the vertical flight levels or split existing sectors into smaller, more manageable areas, and assign additional air traffic controllers to newly created sectors to manage the increased traffic; implementation, including: notifying adjacent control centers of the changes via the Air Traffic Flow Management System (ATFMS) and updating sector boundaries and route assignments in the ATM system; validation, including: continuously monitoring the traffic in the adjusted sectors using updated predictions, and refining sector allocations based on real-time data.

In an embodiment, the airspace flow prediction method based on the ensemble learning algorithm further includes: applying the predicted airspace flow in conflict detection and resolution to prevent potential airspace conflicts by proactively rerouting traffic, which includes the following steps: conflict identification, including analyze predicted trajectories from the GNN-LSTM model and detecting intersections of flight paths at the same altitude or separation breaches within predefined thresholds; conflict resolution planning, including prioritizing conflicts based on severity and proximity and generating alternative routes for affected flights using a pre-defined route database or real-time computation; Communication with stakeholders, including issuing reroute advisories to affected aircraft via Controller Pilot Data Link Communication (CPDLC) or voice instructions and informing adjacent control centers of reroute plans to ensure seamless coordination; and verification, including monitoring updated trajectories for compliance and validate the effectiveness of the rerouting and reassessing for residual or new conflicts.

In an embodiment, the airspace flow prediction method based on the ensemble learning algorithm further includes: applying the predicted airspace flow in runway and gate management to optimize ground resource usage at airports based on arrival flow predictions, which includes the following steps: arrival flow analysis, including using the LSTM model to predict hourly arrival rates and classifying peaks and troughs in traffic to determine required runway and gate capacities; resource allocation, including allocate additional gates during predicted peaks and closing less-used gates during off-peak times and adjusting runway usage plans to balance arrival and departure operations, minimizing delays; operational coordination, including sharing updated gate assignments with airlines via the airport collaborative decision-making (A-CDM) platform and updating runway schedules and notify ground operations teams; and monitoring and adjustment, including using real-time updates to refine gate and runway assignments dynamically.

In an embodiment, the airspace flow prediction method based on the ensemble learning algorithm further includes: applying the predicted airspace flow in flight path optimization to provide alternative trajectories to avoid congestion and minimize delays, which includes the following steps: congestion prediction, including identifying airways and waypoints with predicted high traffic density from the GNN model; trajectory calculation, including computing alternative paths using the ATM system's trajectory optimization module, factoring in safety, fuel efficiency, and minimum deviation from the original route; advisory dissemination, including sharing optimized trajectories with flight operators and onboard Flight Management Systems (FMS); and execution and feedback, including monitoring adherence to the new trajectories and collect feedback from pilots to improve future recommendations.

In an embodiment, the airspace flow prediction method based on the ensemble learning algorithm further includes: applying the predicted airspace flow in emergency response management to rapidly adapt to unexpected events using predicted and real-time data, which includes the following steps: event monitoring, including continuously monitoring airspace for disruptions such as weather changes, restricted zones, or emergencies; impact analysis, including using the GNN-LSTM predictions to identify affected airspace regions and quantify the impact on traffic; alternative planning, including generating contingency plans, including rerouting traffic around affected areas and adjusting airspace boundaries; implementation, including notifying all relevant stakeholders (airlines, pilots, controllers) and implementing alternative plans immediately; and review and feedback, including evaluating the effectiveness of the response and incorporate lessons learned into future prediction models.

In an embodiment, the airspace flow prediction method based on the ensemble learning algorithm further includes: applying the predicted airspace flow in integration into air traffic management systems to embed predictions into the ATM systems for operational automation and real-time decision support, which includes the following steps: prediction integration, including inputting GNN-LSTM predictions into the ATM visualization system and highlighting predicted traffic hotspots and conflicts on airspace maps; automated recommendations, including generating alerts and resolution suggestions for controllers, such as sector splitting or rerouting; controller interaction, including providing a user-friendly interface for controllers to review predictions and accept or modify suggested actions; and real-time updates, including continuously refreshing predictions with incoming data and adjust automated recommendations dynamically.

The foregoing is only the specific embodiments of the present disclosure, but the scope of protection of the present disclosure is not limited thereto. The changes or substitutions easily conceivable by any skilled in the art within the technical scope disclosed by the present disclosure should be included in the scope of protection of the present disclosure. Therefore, the scope of protection of the present disclosure should be based on the scope of protection of the claims.

What is claimed is:

1. An airspace flow prediction method based on an ensemble learning algorithm, comprising the following steps:
    step 1, collecting historical airspace flow data and spatial structure data related to the historical airspace flow data, and preprocessing the historical airspace flow data and the spatial structure data;
    step 2, constructing a graph neutral network (GNN) model, and calculating an influence degree of each node of nodes in an airspace network and an influence degree between the nodes by using the GNN model, wherein the node being any airport or any waypoint;
        wherein in the step 2, the calculating an influence degree of each node of the nodes in an airspace network by using the GNN model comprises:
            defining the node as the airport, and determining, by the GNN model, the influence degree of an airport i on an airspace flow according to a node degree, a node closeness, and a node betweenness centrality of the airport i;
            wherein the node degree refers to a number of edges directly connected with the node, and a calculation formula of the node degree is expressed as follows:

$$D(i) = Ns(i)$$

where D(i) represents the node degree of the airport i; and Ns(i) represents the number of edges connected with the airport i;
        wherein the node closeness is configured to measure a distance between a node and other nodes, and is a reciprocal of a sum of shortest path lengths from the node to the other nodes, and a calculation formula of the node closeness is expressed as follows:

$$C(i) = \frac{1}{\sum_{j \neq i} d(i, j)}$$

where C(i) represents the node closeness of the airport i; j represents other airport connected with the airport i; and d(i,j) represents the shortest path length between the airport i and the airport j;
        wherein the node betweenness centrality is configured to measure a degree that a node acts as a transit station in the airspace network, and is a ratio of a number of shortest paths passing through the node between all node pairs, and a calculation formula being:

$$B(i) = \sum_{s \neq i \neq t} \frac{\sigma_{st}(i)}{\sigma_{st}}$$

where B(i) represents the node betweenness centrality of the airport i; s represents an airport s and t represents an airport t; $\sigma_{st}$ represents a number of shortest paths from the airport s to the airport t; and $\emptyset st(i)$ represents a number of paths passing through the airport i in the shortest paths from the airport s to the airport t;
        wherein the influence degree of the airport i on the airspace flow is expressed as follows:

$$ID(i) = \alpha \cdot \frac{D(i)}{\max D} + \beta \cdot \frac{C(i)}{\max C} + (1 - \alpha - \beta) \cdot \frac{B(i)}{\max B}$$

where ID(i) represents the influence degree of the airport i on the airspace flow, and is also called node influence degree; $\alpha$ and $\beta$ are weight factors; maxD represents a maximum node degree of all airports; maxC represents the maximum node closeness of the all airports; and maxB represents the maximum node betweenness centrality of the all airports;
    wherein in the step 2, the calculating the influence degree between the nodes in the airspace network by using the GNN model comprises:
        when analyzing the influence of an aircraft on the airspace flow, defining the nodes as the airports and waypoints on flight routes between the airports; and
        determining, by the GNN model, the influence degree of the aircraft on the airspace flow of the airport i according to a number of common paths and a shortest path length of the aircraft and a clustering coefficient;
        wherein the number of common paths refers to a number of paths shared between two nodes, and a calculation formula of the number of common paths is expressed as follow:

$$CP(i, j) = \sum_{k \neq i,j} \frac{\sigma_{ik} \cdot \sigma_{kj} \cdot \rho_{ij}}{\rho_{ikj}}$$

where CP(i,j) represents the number of common paths between a node i and a node j; Ojk represents a number of paths from the node i to a node k; $\sigma_{ik}$ represents a number of paths from the node k to the node j; $\rho_{ij}$ represents a number of paths from the node i to the node j; and $\rho_{ijk}$ represents a number of paths from the node i to the node j through the node k;

wherein the shortest path length refers to a minimum number of edges passed by the shortest path between two nodes, and a calculation formula of the shortest path length is expressed as follows:

$$SP(i, j) = \min(ad(i, j))$$

where SP(i,j) represents the minimum number of edges of the shortest path from the node i to the node j; and ad(i,j) represents a number of shortest path edges between the node i and the node j;

wherein the clustering coefficient is configured to measure a degree of connection between neighbor nodes of the node i, and is a ratio of an actual number of connections between the neighbor nodes of the node i to a number of all possible connections, and a calculation formula of the clustering coefficient is expressed as follows:

$$CC_i = \frac{2N(i)}{D(i) \cdot D(i-1)}$$

where CC(i) represents the clustering coefficient between the neighbor nodes of the node i; N(i) represents a number of edges connected between the neighbor nodes of the node i; D(i) represents the node degree of the node i; and D(i−1) represents a node degree of a neighbor node i−1;

wherein the influence degree of the aircraft on the airspace flow of the airport i is expressed as follows:

$$IP(i, j) = \gamma \cdot \frac{CP(i, j)}{\max CP} + \delta \cdot \frac{1}{SP(i, j)} + (1 - \gamma - \delta) \cdot \frac{CC(i)}{\max CC}$$

where IP(i,j) represents the influence degree of the aircraft on the airspace flow of the airport i from the node i to the node j, and is also called influence degree between the nodes; γ and δ are weight factors; maxCP represents a maximum number of common paths between the all node pairs; maxCC represents the clustering coefficient between the neighbor nodes of all nodes;

step 3, performing, by the GNN model, feature conversion and attention fusion on the influence degree of the node, the influence degree between the nodes and time series data to acquire a fused feature vector;

step 4, inputting the fused feature vector into a long short-term memory (LSTM) model to acquire a predicted airspace flow of the node; and step 5, applying the predicted airspace flow of the node to manage navigation of traffic in the airspace network, comprising:
continuously monitoring an airspace for disruptions comprising weather changes, restricted zones, or emergencies;
using the predicted airspace flow of the node to identify airspace regions affected by the disruptions, and quantifying an impact on traffic;
generating contingency plans: rerouting traffic around the affected airspace regions and adjusting airspace boundaries; and
notifying airlines, pilots, and controllers; and implementing the contingency plans.

2. The airspace flow prediction method based on the ensemble learning algorithm according to claim 1, wherein in the step 3, the time series data Ht is the historical airspace flow data in a time series format, and the performing, by the GNN model, feature conversion and attention fusion on the influence degree of the node, the influence degree between the nodes and time series data comprises:
respectively performing feature conversion on the time series data $H_t$ and a spatial feature vector $FV_t$ to fuse in a same feature space:

$$FV_{t'}(i) = FV_t(i) \| ID(i) \| Agg_{j \in NN(i)} IP(i, j)$$

where $FV_t(i)$ represents the spatial feature vector of the node i; ID (i) represents the influence degree of the node i on the airspace flow; NN(i) represents a neighbor node set of the node i; j represents the neighbor node of the node i; IP(i,j) represents the influence degree of the aircraft on the airspace flow of the node i from the node i to the node j; $Agg_{j \in NN(i)} IP(i,j)$ represents an aggregation operation on the IP(i,j) of all neighbor nodes j of the node i; and $FV_t(i)$ represents the spatial feature vector of the node i after feature conversion; and performing weight feature conversion through a full connection layer to ensure that the time series data Ht and the spatial feature vector $FV_t$ are in the same feature space:

$$H_{t'}(i) = W_h \times H_t(i) + b_h$$
$$FV_{t''}(i) = W_{fv} \times FV_{t'}(i) + b_{fv}$$

where $H_t$ (i) represents the time series data of the node i; $H_{t'}$ (i) represents the time series data of the node i after weight feature conversion, and $W_h$ represents a weight matrix of the time series data; bn represents a bias term of the time series data; $FV_{t''}$ (i) represents the spatial feature vector of the node i after weight feature conversion; $W_{fv}$ represents a weight matrix of the spatial feature vector; and $b_{fv}$ represents a bias term of the spatial feature vector.

3. The airspace flow prediction method based on the ensemble learning algorithm according to claim 2, wherein in the step 3, the performing, by the GNN model, attention fusion on the influence degree of the node, the influence degree between the nodes and the time series data to acquire the fused feature vector comprises:

calculating an attention weight by a softmax function:

$$\alpha_t = \frac{\exp(e_t^{(h)})}{\exp(e_t^{(h)}) + \exp(e_t^{(fv)})}$$

$$\beta_t = \frac{\exp(e_t^{(fv)})}{\exp(e_t^{(h)}) + \exp(e_t^{(fv)})},$$

where $\alpha_t$ represents the attention weight of $H_{t'}(i)$; $B_t$ represents the attention weight of $FV_{t''}(i)$; $e_t^{(h)}$ represents a score of $H_t(i)$ and $e_t^{(fv)}$ represents a score of $FV_{t''}(i)$, which are calculated through the full connection layer:

$$e_t^{(h)} = \sigma(W_{att} \times H_{t'}(i) + b_{att})$$

$$e_t^{(fv)} = \sigma(W_{att} \times FV_{t''}(i) + b_{att}),$$

where $\sigma$ represents a sigmoid function, $W_{att}$ represents a weight matrix, and $b_{att}$ represents a bias term; and realizing the feature vector fusion by an attention fusion mechanism;

$$X_t(i) = \alpha_t \times H_{t'}(i) + \beta_t \times FV_{t''}(i)$$

where $X_t(i)$ represents the fused feature vector.

4. The airspace flow prediction method based on the ensemble learning algorithm according to claim 3, wherein the step 4 specifically comprises the following steps:

taking the fused feature vector $X_t(i)$ as an input of the LSTM model, and predicting a time series by using the LSTM model;

$$Y_{t+1}(i) = LSTM(X_t(i))$$

wherein $Y_{t+1}(i)$ represents the predicted airspace flow of the node i.

5. The airspace flow prediction method based on the ensemble learning algorithm according to claim 4, wherein a loss function L of a total model integrated by the GNN model and the LSTM model is:

$$L = \frac{1}{N}\sum_{i=1}^{N}\omega_i \cdot MSE(Y_t(i), Y(i)) +$$

$$\lambda_1 \cdot \frac{1}{N1}\sum_{i=1}^{N1}ID(i) + \lambda_2 \cdot \frac{1}{N1(N-1)}\sum_{i=1}^{N1}\sum_{j=1,j\neq i}^{N}IP(i,j)$$

where N represents a total number of nodes, N1 represents a total number of airports as the nodes, N≥N1, and i represents a $i^{th}$ node; $\omega_i$ represents a weight of the node i, and is used to adjust a weight of the node i to the loss function; $Y_t(i)$ represents a predicted airspace flow of the node i at all time steps; $Y(i)$ represents a real airspace flow of the node i; MSE ($Y_t(i), Y(i)$) represents a mean square error between the predicted airspace flow and the real airspace flow of the node i; $\lambda_1$ represents the weight of ID(i), $\lambda_2$ represents the weight of IP(i,j), and $\lambda_1$ and $\lambda_2$ are used to balance the importance among the prediction result, the influence degree ID(i) of the node and the influence degree IP(i,j) between the nodes.

6. An airspace flow prediction method based on an ensemble learning algorithm, comprising the following steps:

step 1, collecting historical airspace flow data and spatial structure data related to the historical airspace flow data, and preprocessing the historical airspace flow data and the spatial structure data;

step 2, constructing a graph neutral network (GNN) model, and calculating an influence degree of each node of nodes in an airspace network and an influence degree between the nodes by using the GNN model, wherein the node being any airport or any waypoint;

wherein in the step 2, the calculating an influence degree of each node of the nodes in an airspace network by using the GNN model comprises:

defining the node as the airport, and determining, by the GNN model, the influence degree of an airport i on an airspace flow according to a node degree, a node closeness, and a node betweenness centrality of the airport i;

wherein the node degree refers to a number of edges directly connected with the node, and a calculation formula of the node degree is expressed as follows:

$$D(i) = Ns(i)$$

where D(i) represents the node degree of the airport i; and Ns(i) represents the number of edges connected with the airport i;

wherein the node closeness is configured to measure a distance between a node and other nodes, and is a reciprocal of a sum of shortest path lengths from the node to the other nodes, and a calculation formula of the node closeness is expressed as follows:

$$C(i) = \frac{1}{\sum_{j\neq i}d(i,j)}$$

where C(i) represents the node closeness of the airport i; j represents other airport connected with the airport i; and d(i,j) represents the shortest path length between the airport i and the airport j;

wherein the node betweenness centrality is configured to measure a degree that a node acts as a transit station in the airspace network, and is a ratio of a number of shortest paths passing through the node between all node pairs, and a calculation formula being:

$$B(i) = \sum_{s \neq i \neq t} \frac{\sigma_{st}(i)}{\sigma_{st}}$$

where B(i) represents the node betweenness centrality of the airport i; s represents an airport s and t represents an airport t; $\sigma_{st}$ represents a number of shortest paths from the airport s to the airport t; and $\sigma_{st}(i)$ represents a number of paths passing through the airport i in the shortest paths from the airport s to the airport t;

wherein the influence degree of the airport i on the airspace flow is expressed as follows:

$$ID(i) = \alpha \cdot \frac{D(i)}{\max D} + \beta \cdot \frac{C(i)}{\max C} + (1 - \alpha - \beta) \cdot \frac{B(i)}{\max B}$$

where ID(i) represents the influence degree of the airport i on the airspace flow, and is also called node influence degree; α and β are weight factors; maxD represents a maximum node degree of all airports; maxC represents the maximum node closeness of the all airports; and maxB represents the maximum node betweenness centrality of the all airports;

wherein in the step 2, the calculating the influence degree between the nodes in the airspace network by using the GNN model comprises:

when analyzing the influence of an aircraft on the airspace flow, defining the nodes as the airports and waypoints on flight routes between the airports; and determining, by the GNN model, the influence degree of the aircraft on the airspace flow of the airport i according to a number of common paths and a shortest path length of the aircraft and a clustering coefficient;

wherein the number of common paths refers to a number of paths shared between two nodes, and a calculation formula of the number of common paths is expressed as follow:

$$CP(i, j) = \sum_{k \neq i,j} \frac{\sigma_{ik} \cdot \sigma_{kj} \cdot \rho_{ij}}{\rho_{ikj}}$$

where CP(i,j) represents the number of common paths between a node i and a node j; $\sigma_{ik}$ represents a number of paths from the node i to a node k; $\sigma_{kj}$ represents a number of paths from the node k to the node j; $\rho_{ij}$ represents a number of paths from the node i to the node j; and $\rho_{ijk}$ represents a number of paths from the node i to the node j through the node k;

wherein the shortest path length refers to a minimum number of edges passed by the shortest path between two nodes, and a calculation formula of the shortest path length is expressed as follows:

$$SP(i, j) = \min(ad(i, j))$$

where SP(i,j) represents the minimum number of edges of the shortest path from the node i to the node j; and ad(i,j) represents a number of shortest path edges between the node i and the node j;

wherein the clustering coefficient is configured to measure a degree of connection between neighbor nodes of the node i, and is a ratio of an actual number of connections between the neighbor nodes of the node i to a number of all possible connections, and a calculation formula of the clustering coefficient is expressed as follows:

$$CC_i = \frac{2N(i)}{D(i) \cdot D(i-1)}$$

where CC(i) represents the clustering coefficient between the neighbor nodes of the node i; N(i) represents a number of edges connected between the neighbor nodes of the node i; D(i) represents the node degree of the node i; and D(i−1) represents a node degree of a neighbor node i−1;

wherein the influence degree of the aircraft on the airspace flow of the airport i is expressed as follows:

$$IP(i, j) = \gamma \cdot \frac{CP(i, j)}{\max CP} + \delta \cdot \frac{1}{SP(i, j)} + (1 - \gamma - \delta) \cdot \frac{CC(i)}{\max CC}$$

where IP (i,j) represents the influence degree of the aircraft on the airspace flow of the airport i from the node i to the node j, and is also called influence degree between the nodes; y and 8 are weight factors; maxCP represents a maximum number of common paths between the all node pairs; maxCC represents the clustering coefficient between the neighbor nodes of all nodes;

step 3, performing, by the GNN model, feature conversion and attention fusion on the influence degree of the node, the influence degree between the nodes and time series data to acquire a fused feature vector;

step 4, inputting the fused feature vector into a long short-term memory (LSTM) model to acquire a predicted airspace flow of the node; and step 5, applying the predicted airspace flow in runway and gate management to optimize ground resource usage at airports based on arrival flow predictions, comprising:

using the LSTM model to predict hourly arrival rates and classifying peaks and troughs in traffic to determine runway and gate capacities required for the peaks and the troughs;

allocating additional gates during predicted peaks and closing less-used gates during off-peak times and adjusting runway usage plans to balance arrival and departure operations, minimizing delays;

sharing the additional gates during predicted peaks and the less-used gates during off-peak times assignments with airlines via an airport collaborative decision-making (A-CDM) platform and updating runway schedules and notifying ground operations teams; and using the runway schedules to refine gate and runway assignments dynamically.

\* \* \* \* \*